(12) United States Patent
Patrick et al.

(10) Patent No.: US 10,118,439 B1
(45) Date of Patent: Nov. 6, 2018

(54) WHEEL HAVING A SINUSOIDAL CIRCUMFERENCE

(71) Applicants: David Michael Patrick, Ladera Ranch, CA (US); Robert Steven Patrick, Plano, TX (US)

(72) Inventors: David Michael Patrick, Ladera Ranch, CA (US); Robert Steven Patrick, Plano, TX (US)

(73) Assignee: Shark Wheel, LLC, Lake Forrest, CA (US)

(*) Notice: Subject to any disclaimer, the term of this patent is extended or adjusted under 35 U.S.C. 154(b) by 0 days.

(21) Appl. No.: 14/953,218

(22) Filed: Nov. 27, 2015

(51) Int. Cl.
  *B60B 15/02* (2006.01)
  *B60B 21/00* (2006.01)
  *B60B 21/02* (2006.01)
  *B60B 15/00* (2006.01)

(52) U.S. Cl.
  CPC ............ *B60B 15/025* (2013.01); *B60B 15/00* (2013.01); *B60B 15/02* (2013.01); *B60B 15/023* (2013.01); *B60B 21/00* (2013.01); *B60B 21/02* (2013.01); *B60B 2360/10* (2013.01); *B60B 2360/30* (2013.01); *B60B 2900/551* (2013.01)

(58) Field of Classification Search
  CPC ....... B60B 15/00; B60B 15/02; B60B 15/025; B60B 15/023; B60B 1/003; B60B 21/00; B60B 21/02; B60B 19/00; B60B 2360/30; B60B 2360/10; B60B 2900/551
  USPC ...... 301/5.1, 55, 95.11, 41.1, 95.101; 305/1, 305/4
  See application file for complete search history.

(56) References Cited

U.S. PATENT DOCUMENTS

| | | | | |
|---|---|---|---|---|
| 694,303 A | * | 2/1902 | Beskow | B60B 15/26 301/41.1 |
| 740,035 A | * | 9/1903 | Nichols | B60B 15/02 301/41.1 |
| 851,055 A | * | 4/1907 | Beskow | A01D 67/005 180/14.1 |
| 907,991 A | * | 12/1908 | Goodfellow | B60B 15/26 301/41.1 |
| 2,683,495 A | * | 7/1954 | Kopczynski | B62D 61/00 180/7.1 |
| 2,964,887 A | * | 12/1960 | Orozco | B24D 13/08 451/521 |
| 3,363,713 A | * | 1/1968 | Blonsky | B62D 57/022 180/209 |
| 3,717,380 A | * | 2/1973 | Eastwood, II | B60F 3/0007 29/558 |

(Continued)

FOREIGN PATENT DOCUMENTS

| | | | | |
|---|---|---|---|---|
| GB | 263965 A | * | 1/1927 | B60B 15/02 |
| WO | WO 2016048880 A1 | * | 3/2016 | A01G 25/092 |

*Primary Examiner* — Kip T Kotter
*Assistant Examiner* — Scott A Browne
(74) *Attorney, Agent, or Firm* — Gene Scott; Patent Law & Venture Group, LLC (57) ABSTRACT

A circular wheel is aligned in a rotational plane and has a peripheral outfacing surface symmetrical about the plane of rotational. A center line of the width of the peripheral outfacing surface is sinusoidal around the wheel. The wheel may have a central hub, a rim, a medial wheel structure between the hub and the rim, and a tire mounted on the rim. The outfacing surface may be that of the hub, the medial wheel structure, the rim, or the tire depending on the application.

9 Claims, 6 Drawing Sheets

(56) References Cited

U.S. PATENT DOCUMENTS

| | | | | |
|---|---|---|---|---|
| 6,227,622 B1* | 5/2001 | Roderick | ............. | A63C 17/223 |
| | | | | 152/323 |
| 2014/0132059 A1* | 5/2014 | Patrick | .................... | B60B 3/002 |
| | | | | 301/62 |
| 2015/0298501 A1* | 10/2015 | Engel | ....................... | B60B 19/00 |
| | | | | 301/95.101 |

* cited by examiner

WHEEL HAVING A SINUSOIDAL CIRCUMFERENCE

RELATED APPLICATIONS

This application is a continuation-in-part application of pending patent application Ser. No. 13/676,790 which was filed on Nov. 14, 2012 and which is incorporated herein by reference in its entirety.

FIELD OF THE DISCLOSURE

This disclosure relates generally to wheels and, more particularly, to wheels capable of rolling on a supporting surface for carrying a load wherein such load is transferred from the wheel's center of rotation to the supporting surface. The field may include, for example, wheels used for automobiles, bicycles and skate boards, as well as industrial wheels used for conveyor belts and many other applications.

BACKGROUND

The general concept of a wheel is considered to be one of the most inspired inventions of mankind. It is ubiquitous having many forms and structures and seemingly an infinite number of applications from load movers, to watch movements. In engineering we consider the roller bearing a length extended wheel, and we marvel at huge Ferris wheels, small but extremely high speed rotating devices such as gyroscopes and turbo pumps whose speed rivals that of the movement of molecules, and at the almost microscopic wheels and bearings in wrist watches. Wheels, be they generally disk-shaped, spherical, or of any other shape, are well known as being used for transporting loads including those of solids, liquids and gases. Such wheels may have a circular outfacing surface, the contact surface, or may have an attenuated surface like a paddle wheel. Exceptions exist even in this very general definition. Ball bearings do not have a fixed axis of rotation and paddle-wheels and water wheels do not roll-on a surface, but rather roll within a medium. Notwithstanding the many important exceptions, wheels of industry generally have the above described configuration and further most often have a rigid connector means between axle and contact surface. Such typical wheel geometries are used for roller skates, bicycles, motor vehicles, and aircraft. They are also used with spinning machines, conveyor belts, loading gantries, for pulleys, and for most operating apparatus all across industry. Until now the peripheral surface of the load-bearing wheel has always been centered on its plane of rotation. A wheel whose peripheral circumference varies away from its plane of rotation is illustrated in patent RU2438879 filed Nov. 9, 2010, but this wheel is not designed as a load carrier, but rather only as a visual design teaching aid without any other practical use. Steering wheels on board vehicles such as aircraft and submarines, for instance, sometimes also have been produced with portions directed away from the plane of rotation, but such wheels are adapted in this manner only for easier or more comfortable reach and holding, and are used only for relatively minor angles of rotation rather than carrying a radially applied load.

SUMMARY

In this disclosure we refer to the term "wheel" as including a tire, a rim upon which the tire is mounted and forms its outer periphery, and a medial wheel structure joining the rim with a hub. This terminology is arbitrary since these three elements may be referred to by different names in different industries and in different configurations in various applications and some or most of these elements may be excluded and other elements may be included. The wheel has a rotational axis about which it may rotate, and has a plane of rotation within which the wheel rotates and which forms a center of symmetry of the wheel. A peripheral outfacing surface of the wheel circumscribes the rotational axis at a constant normal radial distance from the rotational axis and is symmetrical about the plane of rotation. This surface has a width, generally, but not necessarily, of a constant dimension measured transversally and this width has a circumferential center line whose position varies from the plane of rotation as a sinusoid. An advantage of the disclosed wheel is that it provides the stability of a wide tire footprint with the lower surface friction drag of a narrow tire. The disclosed wheel has found advantageous use on wheeled luggage, ATV vehicles, office chairs, strollers, and wheelchairs as well as for roller skates and motor vehicles for treaded versions, to name just a few applications. Some wheel designs may have pneumatic rubber tires and may alternately be made of polymer materials, and of metal.

These and other aspects of embodiments herein described will be better appreciated when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

In this document, the terms "a" or "an" are used, as is common in patent documents, to include one or more than one. Furthermore, the term "or" is used to refer to a nonexclusive "or," such that "A or B" includes "A but not B," "B but not A," and "A and B," unless otherwise indicated.

BRIEF DESCRIPTION OF THE DRAWINGS

Embodiments of the described apparatus are illustrated only as examples in the figures of the accompanying drawing sheets wherein the same reference numeral refers to the same element as it may appear in multiple figures and drawing sheets.

DETAILED DESCRIPTION

Figure 1:
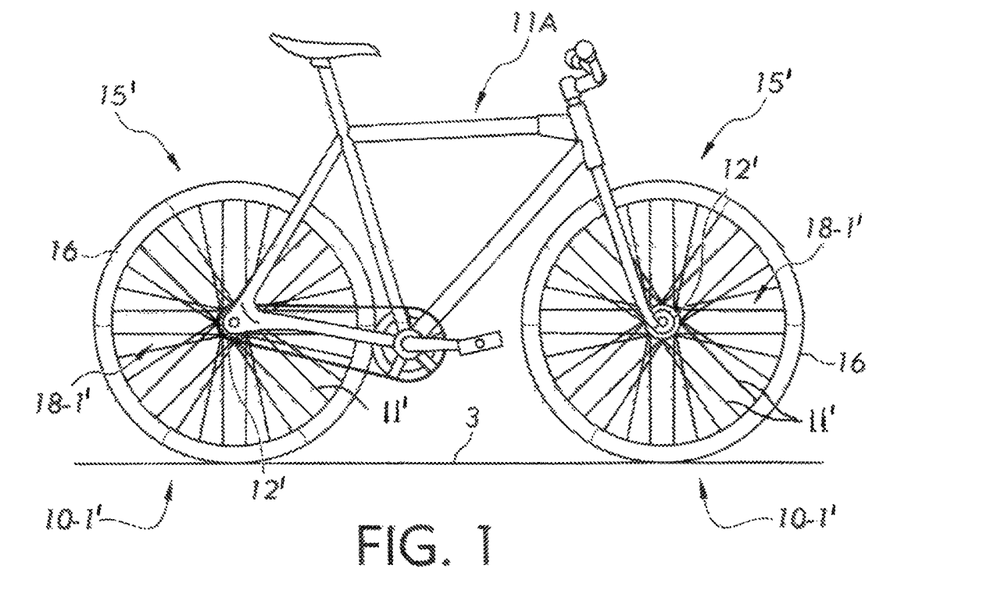
FIG. 1 is a side elevation view of a bicycle according to the invention.
Figure 2:
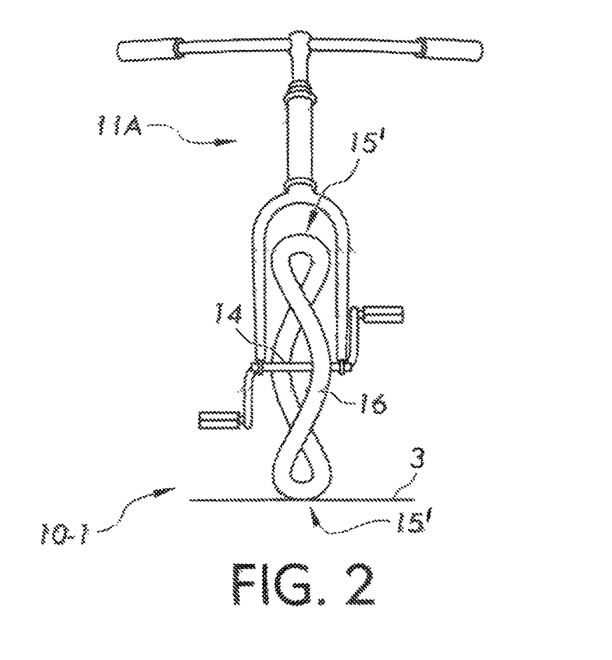
FIG. 2 is a front elevation view showing a wheel thereof in simplified form.
Figure 3A:
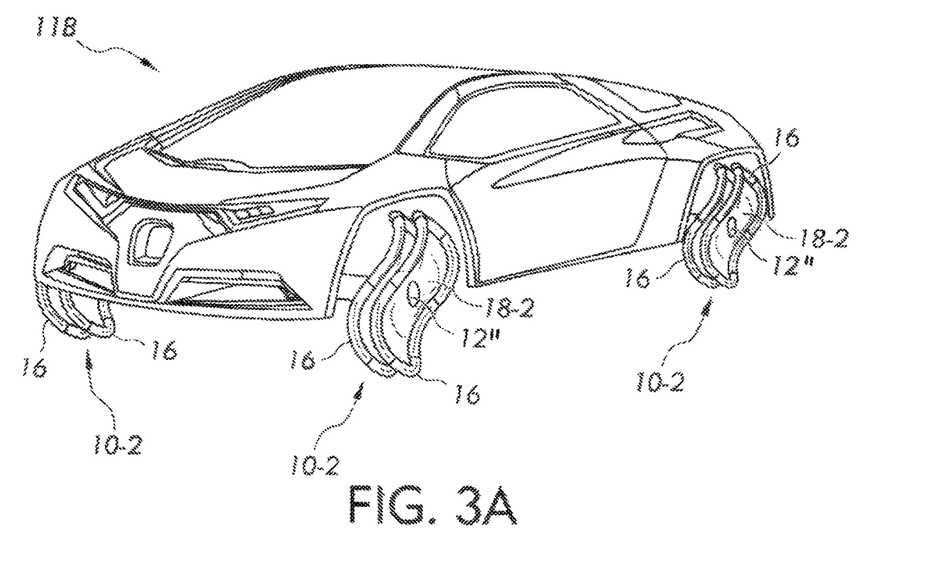
FIG. 3A is a perspective view of an automobile according to the invention.
Figure 3B:
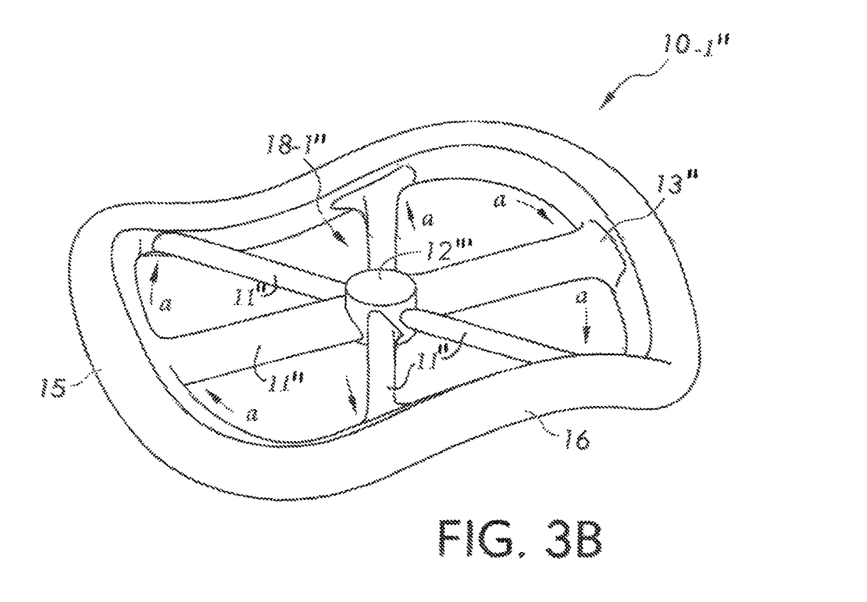
FIG. 3B is a perspective view of a further wheel according to the invention.
Figure 4:
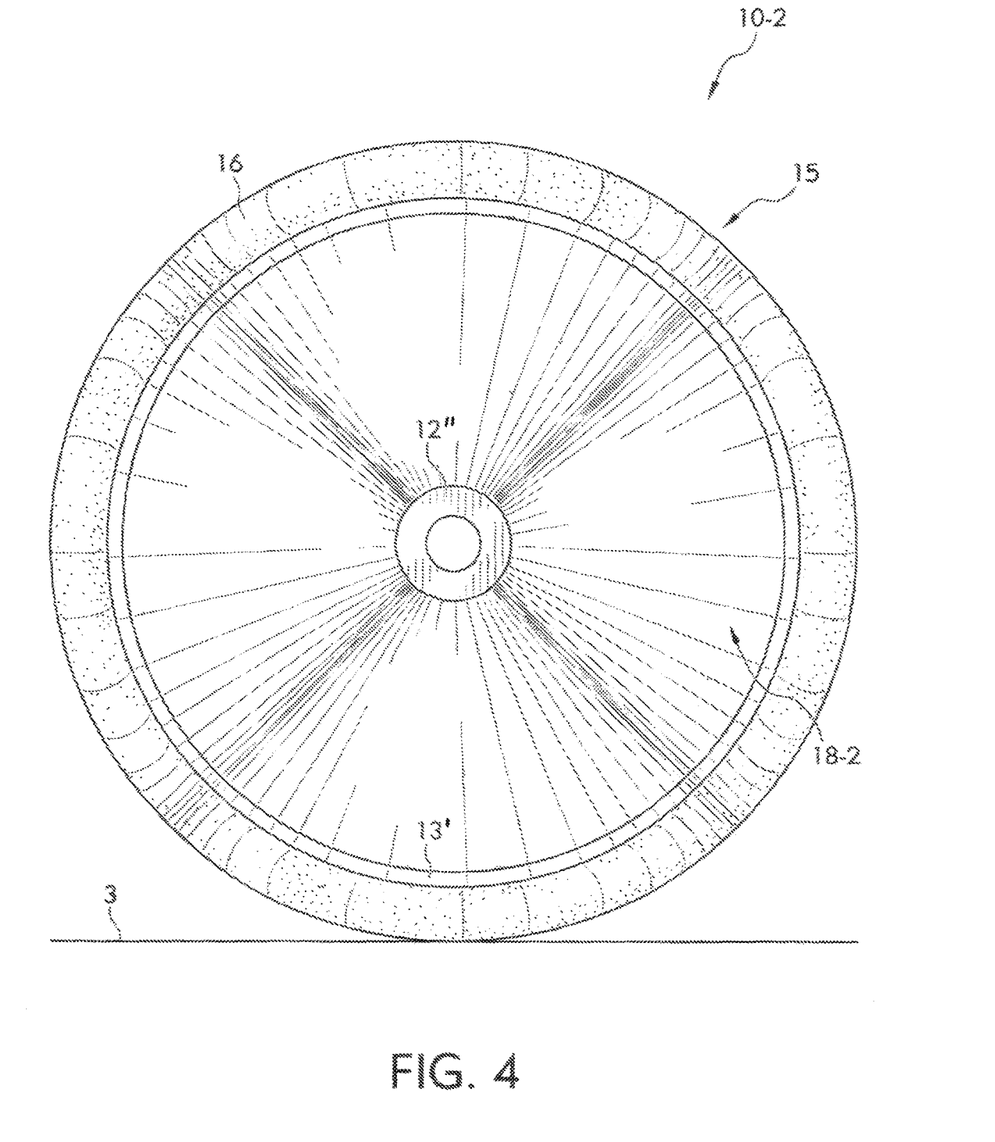
FIG. 4 is a side elevation view of the wheel of FIG. 3A.
Figure 5:
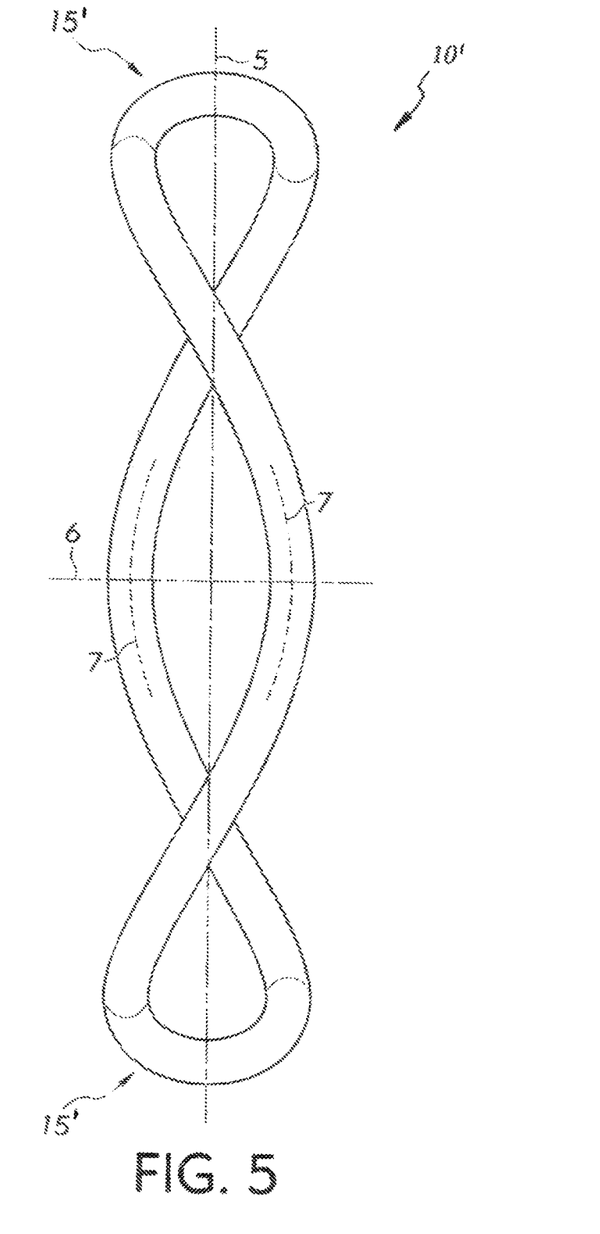
FIGS. 5-7 are front elevation views of wheels shown in simplified form according to the invention.
Figure 6:
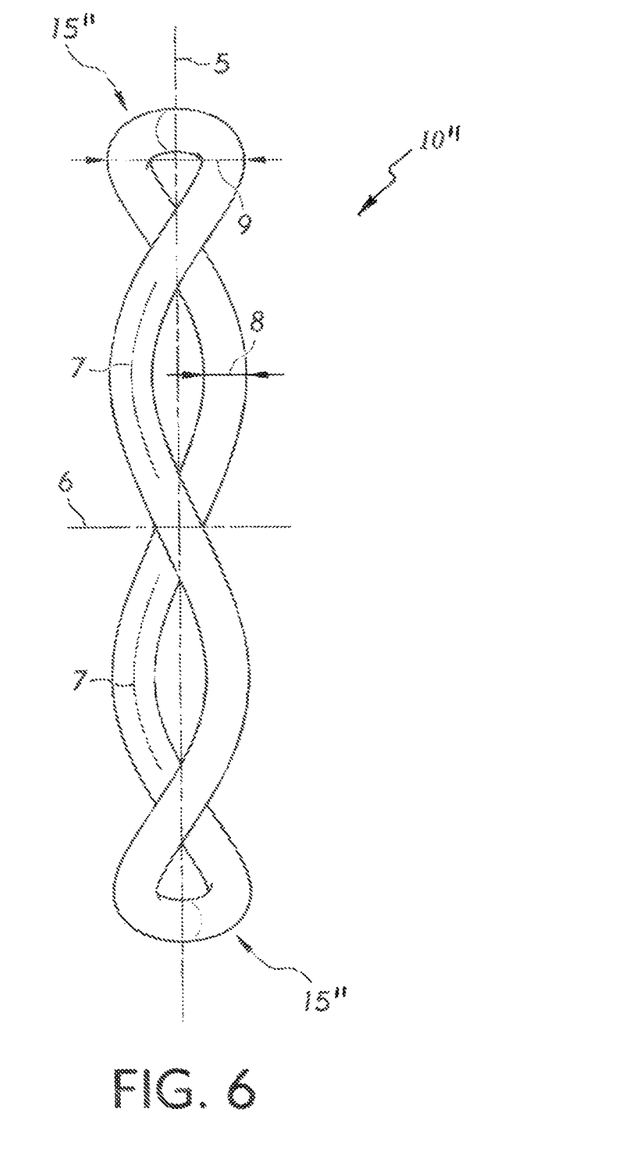
Figure 7:
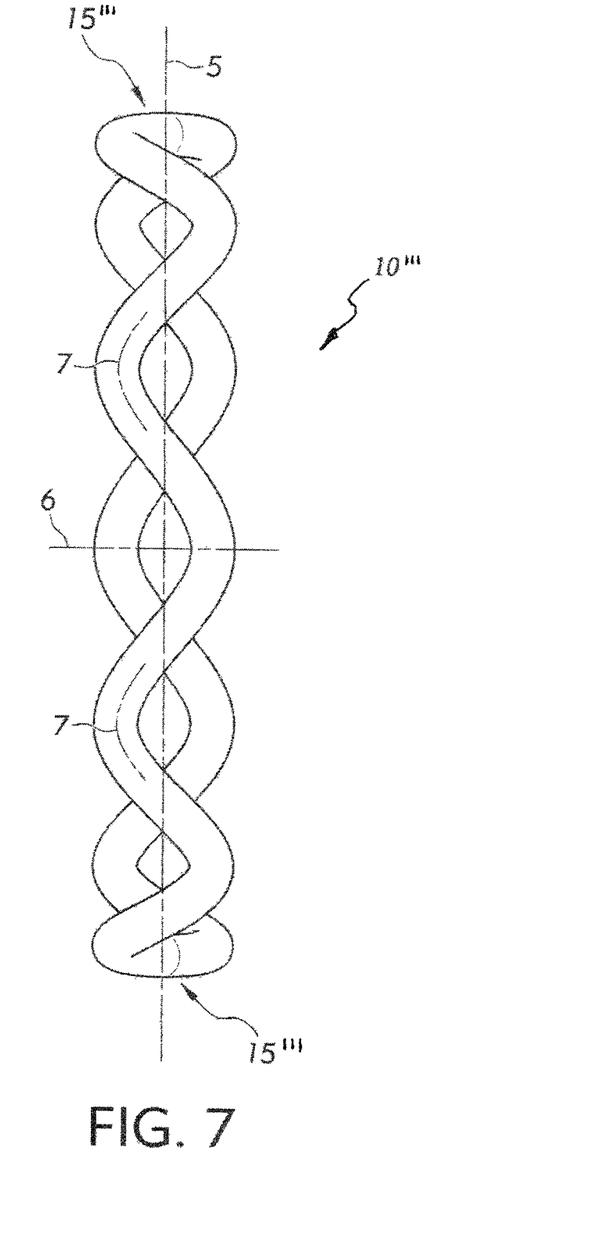

The presently described apparatus is a novel wheel, generically 10 as shown in FIGS. 5-7. FIGS. 1 and 2 show a vehIcle (bicycle) 11A that may be driven on a pavement 3. In one embodiment wheel 10, referred to by reference number 10-1', may have a central hub 12', used to mount wheel 10-1' onto an axle 14 as shown in FIG. 2. In FIGS. 1 and 3B it is shown that a medial wheel structure 18-1' and 18-1" respectively may be an array of radial spokes 11' or 11". In a second embodiment, shown in FIG. 4, wheel 10, referred to by reference number 10-2, may include a rim 13', which may have a tire 16 mounted on it, and also may have a medial wheel structure 18-2 for securing rim 13' to hub 12" for load transfer therebetween. Wheel 10 may have an outfacing peripheral surface 15, forming a circumference of wheel 10 which may be the surface of a tire 16 as shown in FIGS. 1, 2 and 4. In some embodiments of wheel 10, outfacing peripheral surface 15 may be that of rim 13' while in other embodiments, outfacing peripheral surface 15 may be that of medial wheel structure 18-2 or of hub 12". Clearly, it should be understood that whatever is presented as the outfacing peripheral surface of wheel 10 it will be in contact with pavement 3. For instance, hub 12 may have an appropriate diameter for wheels 10 used in applications such as roller skates and skate boards. A wheel 10 according to the invention may be configured in any of the aforementioned embodiments and others as those of skill may contrive in accordance with the following claims, and all such configurations will have an outfacing peripheral surface 15 which rolls on pavement 3. As shown in FIG. 3A, two or more wheels 10-2 may be mounted abreast for improved load carrying. As can be seen in FIG. 3A, the adjacent vehicular wheels 10-2 may be rotationally aligned so that their sinusoidal amplitude peaks and other configurational features are aligned and close nested, that is, spaced apart by the width 8 of peripheral surface 15" as shown in FIG. 6. In FIG. 3A vehicle 11B may be driven on pavement 3 and also may be driven as a water-borne or amphibious craft, and it has been found that the shape of wheel 10-2 as shown with a solid medial wheel structure 18-2 can provide significant thrust to vehicle 11B for propelling it through water. This is especially true when side-by-side wheels 10-2 are mounted close together as shown in FIG. 3A. FIG. 3B illustrates wheel 10-1" in an embodiment where spokes 11" are positioned or aligned with the inflection points "a" of the sinusoidal variation of peripheral surface 15, that is, spokes 11 are aligned with plane of symmetry 5. This has two advantages; first, greater wheel strength in carrying loads since loads applied to hub 12'" are vectored directly to peripheral surface 15 rather than at a non-aligned angle whereby only a component of a load is vectored directly to peripheral surface 15. One of skill will understand that the latter is suboptimal in a wheel where the point of contact of wheel 10 with pavement 3 is positioned to one side of plane of symmetry 5 multiple times during each wheel rotation. A second benefit is that wind resistance to forward rotational movement of wheel 10-1" is reduced since each spoke 11" breaks wind for each next spoke because all spokes move in common plane of symmetry 5.

Generally, wheels used in commerce and for recreation are circular and a centerline of their outfacing peripheral surface lies fully in and aligned with their plane of rotation.

Although wheel 10 is circular as may be seen in FIGS. 1 and 4, the outfacing peripheral surface 15 does not coincide with, and is not aligned with, plane of symmetry 5 as seen in FIGS. 5-7. The axis of rotation of wheel 10 is represented by line 6. Center line 7 represents the geometric center of outfacing peripheral surface 15. Center line 7 is a curve taking a sinusoidal path around the circumference of wheel 10 as is shown in FIGS. 5-7. Therefore, it is shown that outfacing peripheral surface 15', 15", 15'" varies laterally around the circumference of wheel 10', 10", 10'" veering to the left and to the right of plane of symmetry 5. Sinusoidal centerline 7 may have a constant sinusoidal period and sinusoidal amplitude, and this results in a consistently smooth ride when rolling on a smooth pavement 3. FIG. 6, shows that wheel 10 has a width 9 that is wider than outfacing peripheral surface 15 which has a width 8 and it has been found by extensive experimentation that a ratio of wheel width 9 to outfacing peripheral surface 8 is optimally 3. In this case, a wheel 10 with said ratio of 3 will have less rolling drag due to the relatively narrow width 8 of outfacing peripheral surface 15, and yet it will have nearly the same braking friction and rolling stability as a conventional wheel with no sinusoidal variation.

It should be clear that in order to reduce rolling drag width 8 of outfacing peripheral surface 15 should be reduced and to increase braking friction and wheel stability wheel width 9 should be increased. Because these two variables are under the control of the manufacturer opportunities exist for improved rolling characteristics of wheel 10 in various applications. For instance, it has been found through experimentation that when a wheel is made in accordance with this invention having an even number of plural sinusoidal periods, improved operational characteristics are achieved.

In the foregoing description, embodiments are described as a plurality of individual parts, and this is solely for the sake of illustration. Accordingly, it is contemplated that some additional parts or steps may be added, some parts or steps may be changed or omitted, and the order of the parts or steps may be re-arranged, while maintaining the sense and understanding of the apparatus and methods as claimed.

What is claimed is:

1. A vehicular wheel for axial load bearing and load transfer to a supporting surface, said vehicular wheel has a wheel width, an axis of rotation, and orthogonal thereto, a plane of symmetry, said vehicular wheel comprising:
    a single peripheral surface encircling said axis of rotation, wherein said peripheral surface is sinusoidally and symmetrically divergent about said plane of symmetry in plural sinusoidal cycles, having a constant sinusoidal amplitude peak and a constant sinusoidal period;
    wherein, said peripheral surface is convex across a width of said peripheral surface, and is spaced apart from said plane of symmetry at each sinusoidal amplitude peak by a space equal to one-half of said width of said peripheral surface.

2. The vehicular wheel of claim 1 wherein said peripheral surface width is equal to one-third of a full width of said wheel width.

3. The vehicular wheel of claim 1 wherein a structure supporting said peripheral surface has spokes, wherein said spokes are aligned with said plane of symmetry.

4. The vehicular wheel of claim 1 wherein a structure supporting said peripheral surface is disc shaped.

5. A pair of vehicular wheels for axial load bearing and load transfer to a supporting surface, wherein each one of said wheels has a wheel width, an axis of rotation, and orthogonal thereto, planes a plane of symmetry, said vehicular wheels each comprising:
    a single peripheral surface encircling said axis of rotation, wherein said peripheral surface is sinusoidally and symmetrically divergent about said plane of symmetry in plural sinusoidal cycles, having a constant sinusoidal amplitude peak and a constant sinusoidal period;
    wherein, said peripheral surface has is convex across a width of said peripheral surface, and is spaced apart from said plane of symmetry at each sinusoidal amplitude peak by a space equal to one-half of said width of said peripheral surface.

6. The vehicular wheels of claim 5 wherein each, said peripheral surface width is equal to one-third of said wheel width.

7. The vehicular wheels of claim 5 wherein at least one wheel of said pair of vehicular wheels has a spoked structure supporting said peripheral surface, wherein said spoked structure comprises spokes wherein said spokes are aligned with said plane of symmetry.

8. The vehicular wheels of claim 5 wherein at least one wheel of said pair of vehicular wheels has a disk structure supporting said peripheral surface.

9. The vehicular wheels of claim 5 wherein said sinusoidal amplitude peaks of said wheels are rotationally aligned and spaced apart by said width of said peripheral surface.

* * * * *

UNITED STATES PATENT AND TRADEMARK OFFICE
CERTIFICATE OF CORRECTION

PATENT NO. : 10,118,439 B1  
APPLICATION NO. : 14/953218  
DATED : November 6, 2018  
INVENTOR(S) : David Michael Patrick and Robert Steven Patrick

Page 1 of 1

It is certified that error appears in the above-identified patent and that said Letters Patent is hereby corrected as shown below:

On the Title Page

Below Item (22) insert:
--(63) Related U.S. Application Data
Continuation-in-part of application No. 13/676,790, filed on Nov. 14, 2012.--

Signed and Sealed this
Twenty-second Day of October, 2019

Andrei Iancu
*Director of the United States Patent and Trademark Office*